(12) United States Patent
Tung et al.

(10) Patent No.: US 7,933,982 B2
(45) Date of Patent: Apr. 26, 2011

(54) APPARATUS AND METHOD FOR PRESENCE SERVICE ON INTER-DOMAIN

(75) Inventors: Hsing-Fu Tung, Taipei (TW); Che-Shiun Ho, Taipei (TW); Wan-Wan Shen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 518 days.

(21) Appl. No.: 12/034,059

(22) Filed: Feb. 20, 2008

(65) Prior Publication Data
US 2009/0144405 A1    Jun. 4, 2009

(30) Foreign Application Priority Data
Nov. 29, 2007 (TW) ............................ 96145398 A

(51) Int. Cl.
*G06F 15/173* (2006.01)
(52) U.S. Cl. ....................................................... 709/223
(58) Field of Classification Search ................... 709/223
See application file for complete search history.

(56) References Cited

U.S. PATENT DOCUMENTS

| | | | | |
|---|---|---|---|---|
| 7,478,172 B1 * | 1/2009 | Lee et al. | ...................... | 709/249 |
| 7,607,138 B2 * | 10/2009 | Donovan et al. | ............... | 719/318 |
| 7,636,753 B2 * | 12/2009 | Wong et al. | .................... | 709/204 |
| 2002/0035594 A1 * | 3/2002 | Dreke et al. | ................... | 709/203 |
| 2005/0283477 A1 | 12/2005 | Donovan et al. | ................... | 707/8 |
| 2006/0064473 A1 * | 3/2006 | Borella et al. | ................. | 709/220 |
| 2007/0083675 A1 * | 4/2007 | Vemulapelli et al. | ......... | 709/246 |
| 2009/0089804 A1 * | 4/2009 | Beadle et al. | ................. | 719/318 |
| 2009/0144405 A1 * | 6/2009 | Tung et al. | ..................... | 709/223 |

OTHER PUBLICATIONS

IETF Internet Draft "Problem Statement for SIP/SIMPLE", Feb. 2007.

* cited by examiner

*Primary Examiner* — Krisna Lim

(57) ABSTRACT

Disclosed is an apparatus and method for presence service on inter-domain. The apparatus comprises an enhanced inter-domain presence (EIP) module and an enhanced inter-domain presence authorization document (EIPAD) module. When at least a watcher requests a presence subscription to a foreign domain, the EIP module dynamically aggregates the foreign domain presentities for all local watchers having the subscription request, and produces a foreign domain document (FDD). The EIP module also acts as a presence client having the subscription for foreign-domain, and dispatches presence status information. The enhanced inter-domain presence authorization document module resolves the FDD contents, identifies the subscribed foreign-domain presentities, then accesses a corresponding presence authorization document and notifies it to the presence server on the watcher domain.

16 Claims, 13 Drawing Sheets

APPARATUS AND METHOD FOR PRESENCE SERVICE ON INTER-DOMAIN

FIELD OF THE INVENTION

The present invention generally relates to an apparatus and method for presence service on inter-domain.

BACKGROUND OF THE INVENTION

Presence service is a widely used communication technology and service on Internet. Presence service allows the users, after logging in, to know the presence status of the other contacts that are interested in, such as online, offline, in a meeting, busy, and so on, for further communication through the instant messaging, audio/video or other communications. The users may also make use of presence authorization mechanism, such as agree, reject, block, unblock, and so on, to determine whether the watchers can see their presence status.

In the inter-domain environment of the internet or wireless network communication, the inter-domain traffic greatly increases as the service interworking between domains and the amount of users increase.

FIG. 1 shows an exemplary schematic view of a model of a presence service system. Referring to FIG. 1, in the client-server model of the basic presence service, the client plays the roles of watchers, such as B1-B4, and presentities, such as A1-A4. The watchers obtain the presence status of the presentities watched by presence server (PS) 110 and list server (LS) 120.

The presence status information may include the basic online/offline status and the advanced status, such as activity in progress, e.g., meeting, meal, busy, away, or even the user's mood state. Presence server 110 is responsible for receiving presence status published by the presentity, and distributing the presence status at the requests of the watcher. List server 120 is responsible for storing the application configuration documents, such as resource list and presence authorization rule, of client like presentity A1-A4 and watcher B1-B4. List server 120 also allows a client to read, write, and modify application configuration data stored on it.

The exemplary presence service system uses the mechanisms of publish, subscribe/notify, presence authorization rule, and resource list service (RLS) to propagate the presence status.

The presentity may send the publish requests to publish the presence status to the presence server. The watcher may use subscribe request to point the intended subscribes and the specific information on the subscribee. The specific information may include presence status or the configuration document. The presence server may use notify requests to notify the subscriber of the specific information and the subsequent content changes of that specific information.

As shown in FIG. 2, presentity A1 publishes presence status 201, such as away, to presence server 110. Watchers B1-B4 may subscribe to the intended subscribee for specific information, such as presentity A1 for the presence status of A1. Presence server 110 notifies watchers B1-B4 of the current presence status of presentity A1, such as away.

The subscribe/notify mechanism has an expire value that indicates the duration of the subscription. After presence server 110 receives the subscription message, presence server 110 must keep the subscription relation 220 between watchers B1-B4 and presentity A1. Once presentity A1 publishes new presence status, presence server 110 must use notify message to notify watchers B1-B4 during the duration of subscription. In order to keep subscriptions effective beyond the duration, the subscriber, such as watchers B1-B4, must refresh subscriptions on a periodic basis, i.e., retransmits the subscription message before the expiration.

FIG. 3 shows an exemplary schematic view of using presence authorization mechanism. Each of presentities has a presence authorization document on the list server which specifies what presence information may be given to which watchers. The content of the presence authorization document includes allow, reject and block setting and the filtering setting on presence status information by the presentity for each watcher.

As shown in FIG. 3, when presence server 110 receives the subscription (301) from the watcher, presence server 110 uses the presentity, e.g., A1, as the intended subscribee and the presence authorization document of the presentity as the specific information to issue subscription message (labeled as 302) to list server 120 through the subscription mechanism to obtain the contents of presence authorization document (labeled as 310) of the presentity for determining whether the watcher is authorized to obtain the presence status. Once the presentity changes the presence authorization settings, such as block or unblock, list server 120 must notify presence server 110 of the setting change through the notification mechanism during the duration of subscription, shown as 303. Then, presence server 110 adjusts the subscription authorization relation and uses the notification mechanism to notify the watcher, e.g., B1, shown as 304, of the presence status of presentity, e.g., A1.

FIG. 4 shows an exemplary schematic view of using resource list service mechanism. Referring to FIG. 4, to reduce the number of subscribe/notify messages, each watcher stores a resource list document 410 on the list server. The contents of resource list document 410 include all the presentities that the watcher intends to subscribe, such as B1's resource list. Through watcher B1's resource list B1_RLS (410) on list server 120, watcher B1 need not establish the subscription for each individual presentity of A1-A3, instead, watcher B1 may establish the subscription with an entire resource list and then receive notifications when the state of any of the resources in the list changes.

Watcher B1 uses the list B1_RLS as the intended subscribee and the presence status as the specific information to send the subscription to presence server 110. After receiving this subscription message for an entire resource list, presence server 110 uses the subscribe/notify mechanism to send the subscription message with the watcher as the intended subscribes and resource list document of the watcher as the specific information to list server 120 to obtain all resources within the list B1_RLS for knowing the actual individual presentity of A1-A3 to be subscribed to. Then, presence server 110 creates one back-end subscription for every resource in the resource list B1_RLS being subscribed to.

According to the presence authorization document of each of presentities A1-A3, presence server 110 aggregates the presence status of presentities A1-A3 and uses subscribe/notify mechanism to notify to watcher B1, shown as 415. When watcher B1 changes the resource list, list server 120 must use the notification mechanism to notify presence server 110 of this change during the duration of subscription, shown as 425. Then, presence server 110 adjusts the subscription relation and then notifies watcher B1.

In the deployment environment of presence service, the watcher and the presentity may belong to different domains with different presence servers and list servers. In other words, the watcher on domain A may subscribe to the presentity on domain B to form the inter-domain presence service. From the watcher point of view, the traffic analysis of presence service may be divided into three stages: initialization stage, steady stage, and termination stage.

In the initialization stage, the watcher logs in and subscribes the presence status of the resource list. Because the list includes the presentities on the foreign domain, the presence server on the watcher domain sends the subscription message to the presence server on the foreign domain. To obtain the contents and subsequent content changes on the resource list, the presence server on the foreign domain subscribes the resource list from presence server on the watcher domain to obtain the individual actual presentities to be subscribed to. Before the presence server on the foreign domain uses notification message to notify the presence status, to perform presence authorization, the presence server on the foreign domain must subscribe the presence authorization document of the subscribed presentity from the list server on the foreign domain to obtain the authorization setting and subsequent setting changes by the presentity on the watcher, and then generates corresponding presence status accordingly to notify the watcher of the presence status.

The steady stage includes the duration after the user's login and before logout. There are four non-periodical user behaviors in the steady stage that will result in inter-domain message transmission. The inter-domain message transmission caused by the user behaviors includes the watcher's subscription/notification on the presence status of presentity and the presence server's subscription/notification on the watcher's resource list. The amount of messages transmitted is proportional to the number of the watchers. When the presentity changes the presence status, the presence server must notify each subscribing watcher. The following describes the four non-periodical user behaviors.

(a) When the presentity on the foreign domain changes the presence status, the presentity uses the publish mechanism to publish its presence status change to the presence server on the foreign domain. After the presence server on the foreign domain checks all subscriptions related to the presentity, the presence server on the foreign domain uses the notification message to notify the updated presence status to the presence server on the watcher domain of the authorized watchers.

(b) The subscription refresh includes the refresh update to the three subscriptions: the watcher's subscription to the presence status of presentity, the presence server's subscription to the resource list of watcher, and the presence server's subscription to the presence authorization document of presentity.

(c) The watcher changes the resource list. Because in the initialization stage, the presence server on the foreign domain has already established the subscription for the resource list, the list server on the watcher domain will notify the changes made on the resource list by the watcher to the presence server on the foreign domain and the presence server on the foreign domain will adjust the subscription and then notify the presence status to the presence servers on the watcher domain of the related authorized watchers.

(d) The presentity changes the presence authorization. Because in the initialization stage the presence server on the foreign domain has already established the subscription for the presence authorization document, the list server on the foreign domain will notify the presence server on the foreign domain of the changes made on the presence authorization document by the presentity, and then the presence server on the foreign domain will adjust the subscription and notify the updated presence status to the presence servers on the watcher domain of the related watchers.

Before logging off, the watcher must terminate all the subscriptions in the termination stage. In addition to the watcher terminating the subscription to the presence status, the presence server must also terminate the subscription for the resource list of the watcher, and the subscription to the presence authorization document of the presentity.

As the presence service is trending intercommunication and the number of the users grows, presence federation may be very common and a very large number of messages transmitted in order to establish federation between different domains will also grow which must result in the traffic workload of the network.

SUMMARY OF THE INVENTION

The present invention provides an apparatus and method for inter-domain presence service. The presence server may establish the list subscription for the watchers on the same domain to the presence server of the presentities on the foreign domains using the domain as a subscription unit. The subscription to the presence authorization by the presence server of watcher may also use the foreign domain document to establish the list subscription.

In an exemplary embodiment, the disclosed is related to an apparatus for inter-domain presence service, applicable to the inter-domain presence service system. The apparatus may comprise an enhanced inter-domain presence (EIP) module, executed respectively in the presence server on each domain, and an enhanced inter-domain presence authorization document (EIPAD) module, executed respectively in the list server on each domain. Here the presence server and the list server on the same domain are logical network entities, they may be separated as two isolated physical entities or be co-located at one physical network entity. When at least a watcher requests a presence subscription to a presentity at a foreign domain, the EIP module dynamically aggregates the presentities on the foreign domain for all watchers having the subscription request, and produces a foreign domain document (FDD). The EIP module also acts as a presence client having the subscription to the foreign domain and receiving the notification from the foreign domain, and dispatches the right presence information to accurate and authorized watchers. The EIPAD module on foreign domain list server resolves the FDD contents, identifies the subscribed presentities on the foreign domain, and notifies the EIP module of the presence server on the foreign domain, then accesses a corresponding presence authorization document and notifies the contents of the document to the presence server on the watcher domain based on presence server's subscription. The EIP module on the foreign domain presence server, after receiving the notification of the actual subscribed presentities from list server on the foreign domain, composes the corresponding presence status, and notifies to the presence server on the watcher domain.

In another exemplary embodiment, the disclosed is directed to a method for inter-domain presence service, applicable to the inter-domain presence service system. When at least a watcher requests a presence subscription to a presentity at a foreign domain, the method comprises: dynamically aggregating the foreign domain presentities for all watchers having the subscription request, and producing a foreign domain document (FDD); according to the FDD, a presence server on the watcher domain sending a presence subscription request to a presence server on the foreign domain; the presence server on the foreign domain composing the presence status of individual presentity on the foreign domain in the FDD and notifying to the presence server on the watcher domain; according to the FDD, the presence server on the watcher domain requesting the list server on the foreign domain for the subscription to the presence authorization document; when the presence server on the watcher domain receiving the presence status of the presentity on the foreign domain, according to the received presence authorization document, composing the presence status of the subscribed presentity and then notifying to the local subscribers (watchers); and when the presence server on the watcher domain receiving the notification on the changes of the presence authorization document, composing the presence status of the subscribed presentity and notifying to the local subscribers (watchers).

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The present invention utilizes the presence server in watcher domain to watch on behalf of all the watchers in the local domain, and establishes the subscription from the watcher-domain presence server to the foreign-domain presentities in an inter-domain presence service environment. In other words, the subscription is changed from "an individual watcher to an individual presentity" to "domain to domain" subscription.

In the disclosed embodiments of the present invention, the presence server may also act as a client. The presence server has an EIP module for dynamically aggregating the foreign-domain presentities for all local watchers having the subscription request, and acts as a presence client having the subscription to the foreign domain presentities and dispatches presence status information received from the foreign-domain. The EIP module on foreign domain is responsible for receiving the presence subscription from the presence server on the watcher domain, composing the presence status, and notifying to the watcher domain presence server. The list server has an EIPAD module for resolving the FDD contents to identify the actual subscribed presentities and accessing their presence authorization document.

Figure 1:
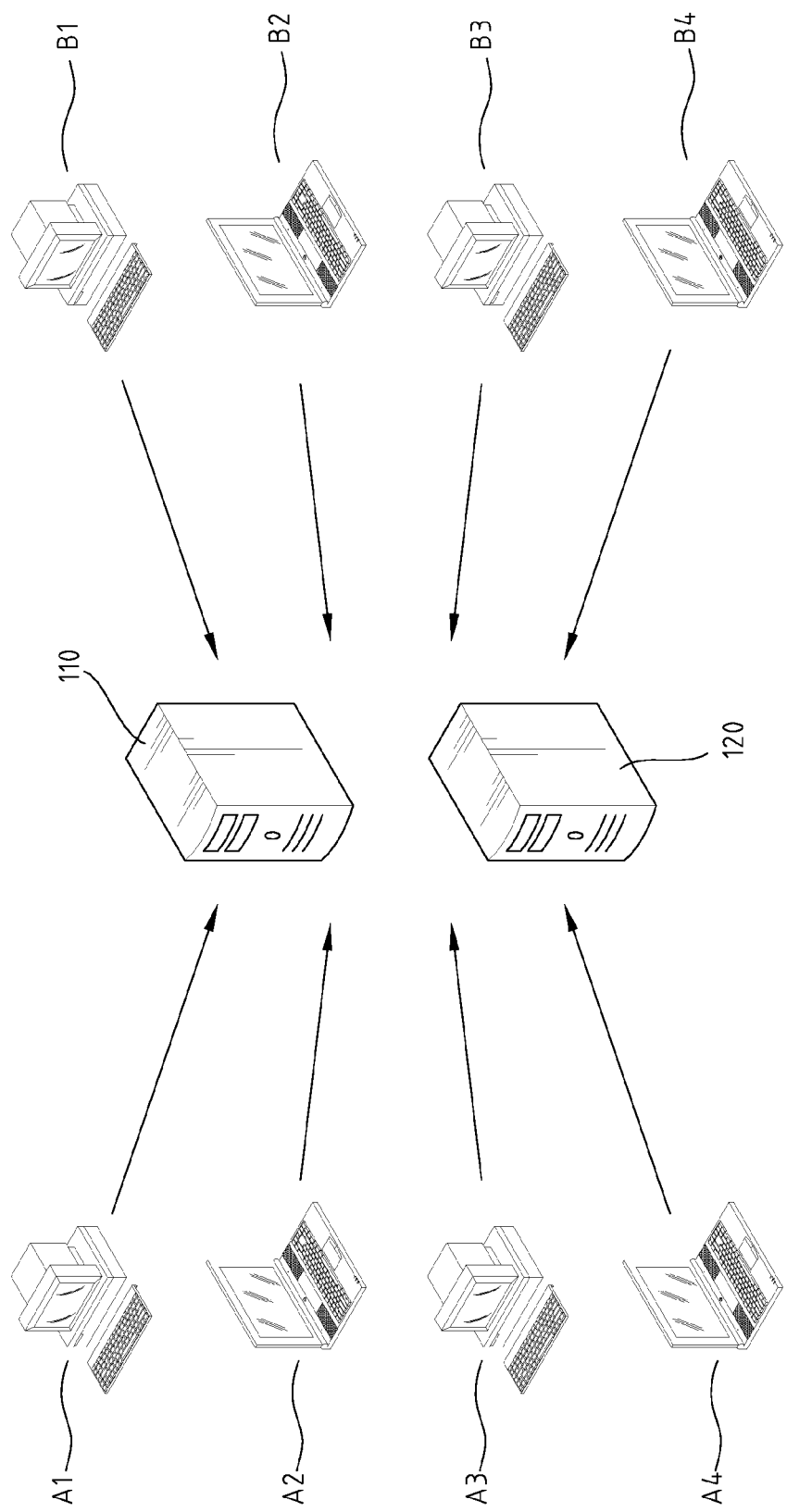
FIG. 1 shows a schematic view of an exemplary model of a basic presence service system.
Figure 2:
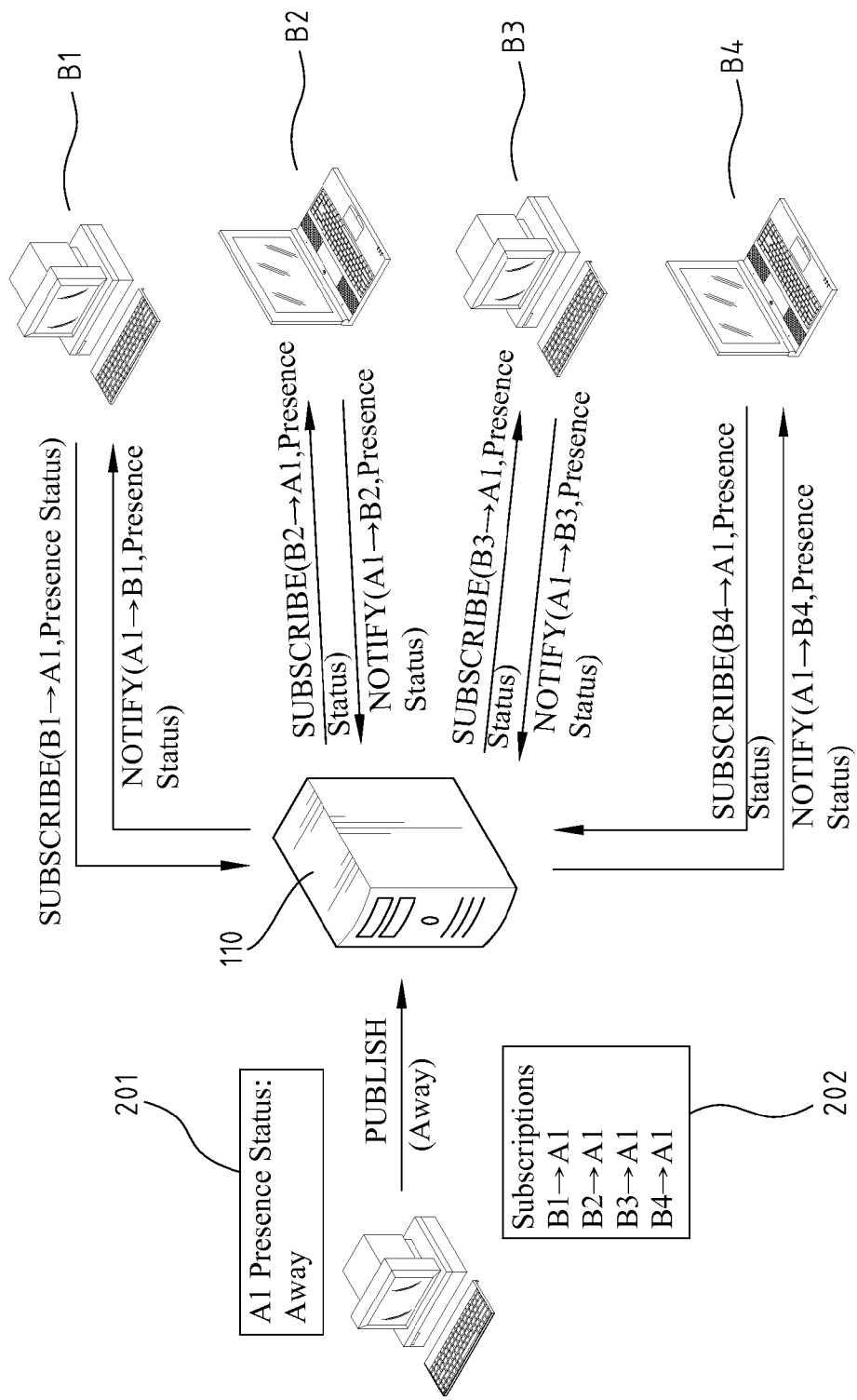
FIG. 2 shows a schematic view for utilizing an exemplary publish and subscribe/notify mechanisms to transmit presence status information.
Figure 3:
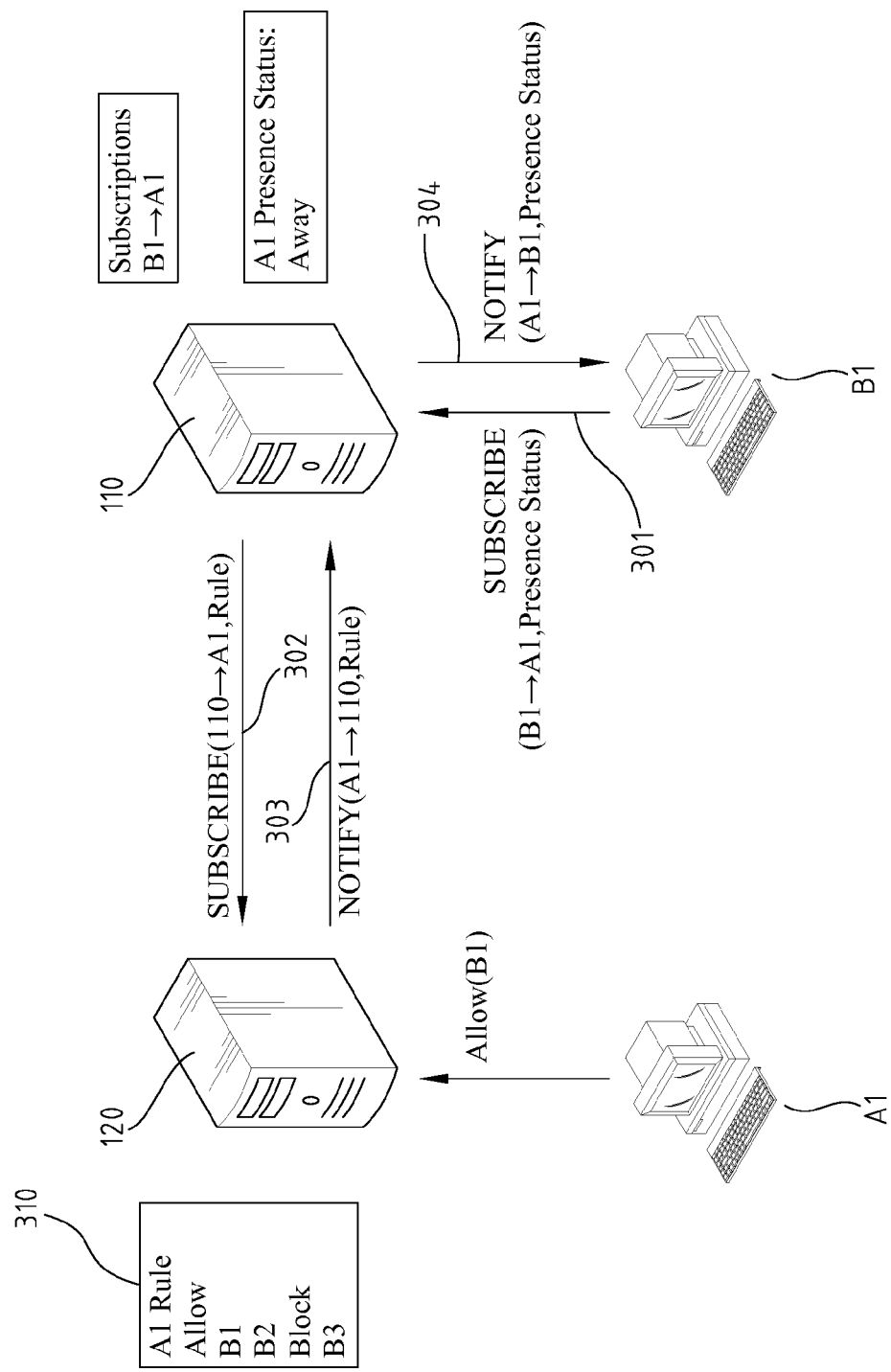
FIG. 3 shows a schematic view for utilizing an exemplary presence authorization mechanism.
Figure 4:
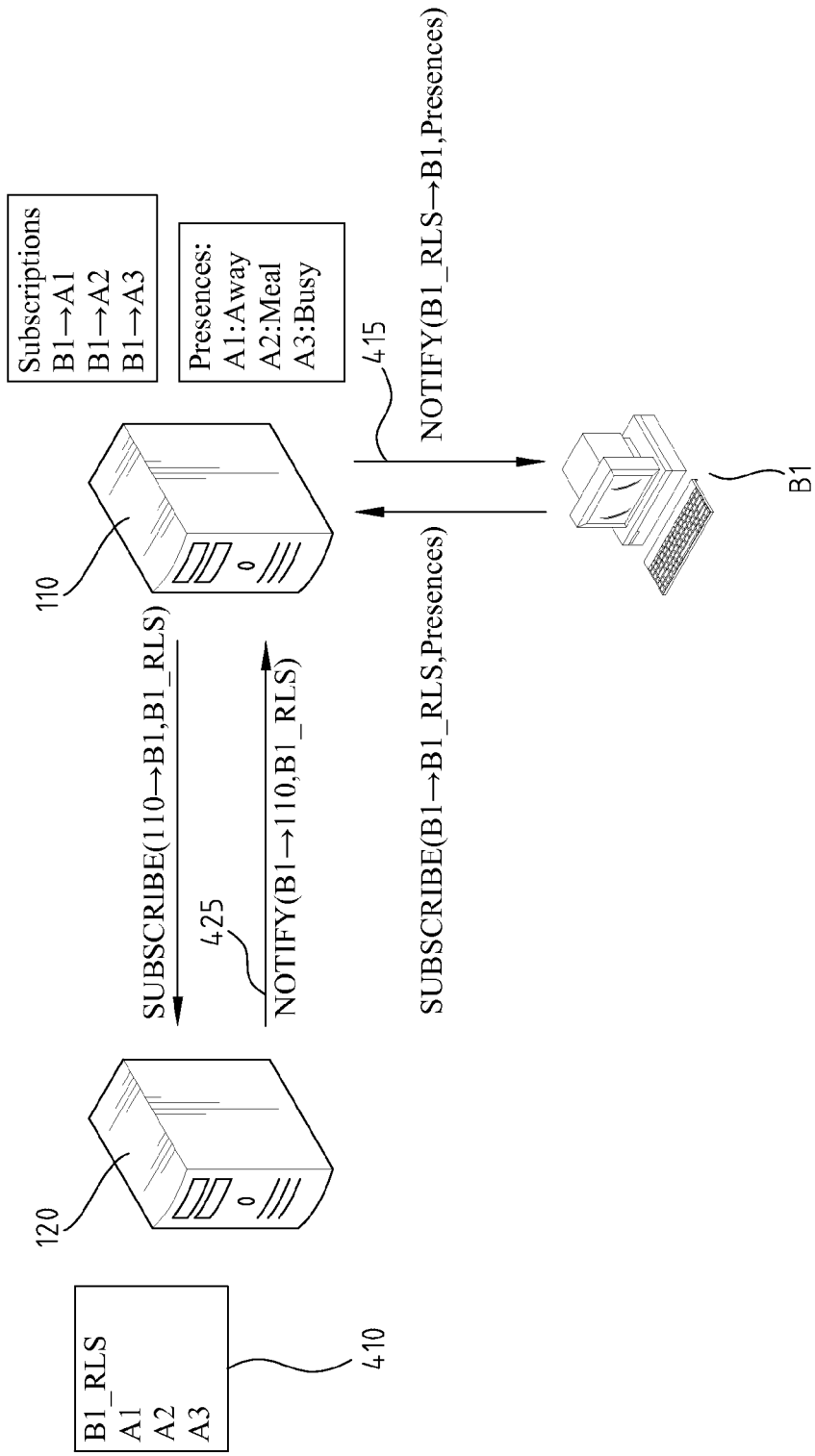
FIG. 4 shows a schematic view for utilizing an exemplary resource list service mechanism.
Figure 5:
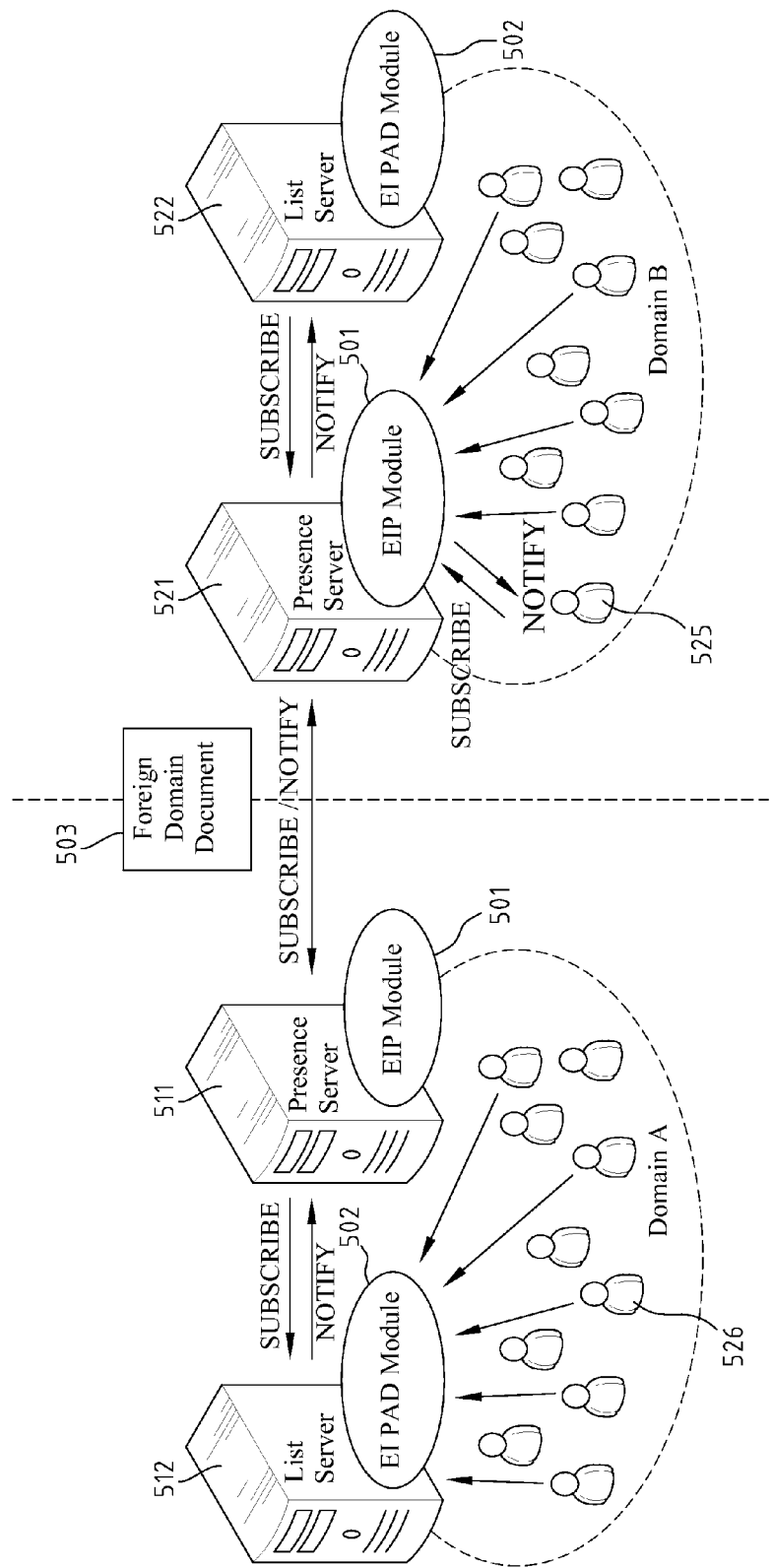
FIG. 5 shows an exemplary apparatus for presence service on inter-domain, consistent with certain disclosed embodiments.

FIG. 5 shows an exemplary apparatus for presence service on inter-domain, consistent with certain disclosed embodiments. Without the loss of generality, in the exemplary apparatus of FIG. 5, a plurality of clients residing on domain A and domain B are used for explanation, where presence server 521 and list server 522 are on domain B and presence server 511 and list server 512 are on domain A.

Referring to FIG. 5, the exemplary apparatus comprises an enhanced inter-domain presence (EIP) module 501 and an enhanced inter-domain presence authorization document (EIPAD) module 502. EIP module 501 is executed on presence server 511 and presence server 521, respectively. EIPAD module 502 is executed on list server 512 and list server 522, respectively. EIP module dynamically aggregates the foreign-domain presentities subscribed by all the local watchers to produce a foreign domain document (FDD), and acts as a presence client subscribing to the foreign domain presentities as well as dispatches the presence status information. In addition, EIP modules on the foreign-domain presence server is responsible for receiving the presence subscription of the presence server on the watcher domain, composing the corresponding presence status information, and notifies to the presence server on the watcher domain. EIPAD module is responsible for resolving the FDD contents, identifying the actual subscribed presentities, such as 526, and accessing the corresponding presence authorization document. The FDD content is the set of the presentities on a single foreign domain subscribed by the watchers on the local domain.

Therefore, when at least a watcher 525 from domain B requests for a presence service of domain A, EIP module 501 of local domain B dynamically aggregates all the presentities on foreign domain A subscribed by watchers on local domain B to produce a FDD 503, and based on FDD 503 acts as a presence client having the list subscription of presence to the foreign domain presence server, and dispatches presence status information to watchers on local domain B. EIP module 501 on presence server 511 on foreign domain A receives the presence subscription from presence server 521 on local domain B, composes presence status information of the actual subscribed presentities, and notifies to presence server 521. When list server 512 receives requests for presence authorization document of list subscription to FDD 503, EIPAD module 502 on foreign domain A resolves FDD 503 contents, identifies actual subscribed presentities on foreign domain A, accesses the corresponding presence authorization document, and notifies to presence server 521 on local domain B.

Hence, the presence server on each domain may act on behalf of all the watchers on the local domain to establish a list subscription to foreign-domain presentities using domain as a subscription unit. In this manner, the inter-domain traffic may be reduced from depending on the number of watchers to a constant. Therefore, by decreasing the duplication of the messages transmitted, the inter-domain traffic may be reduced to save the network resource.

Figure 6:
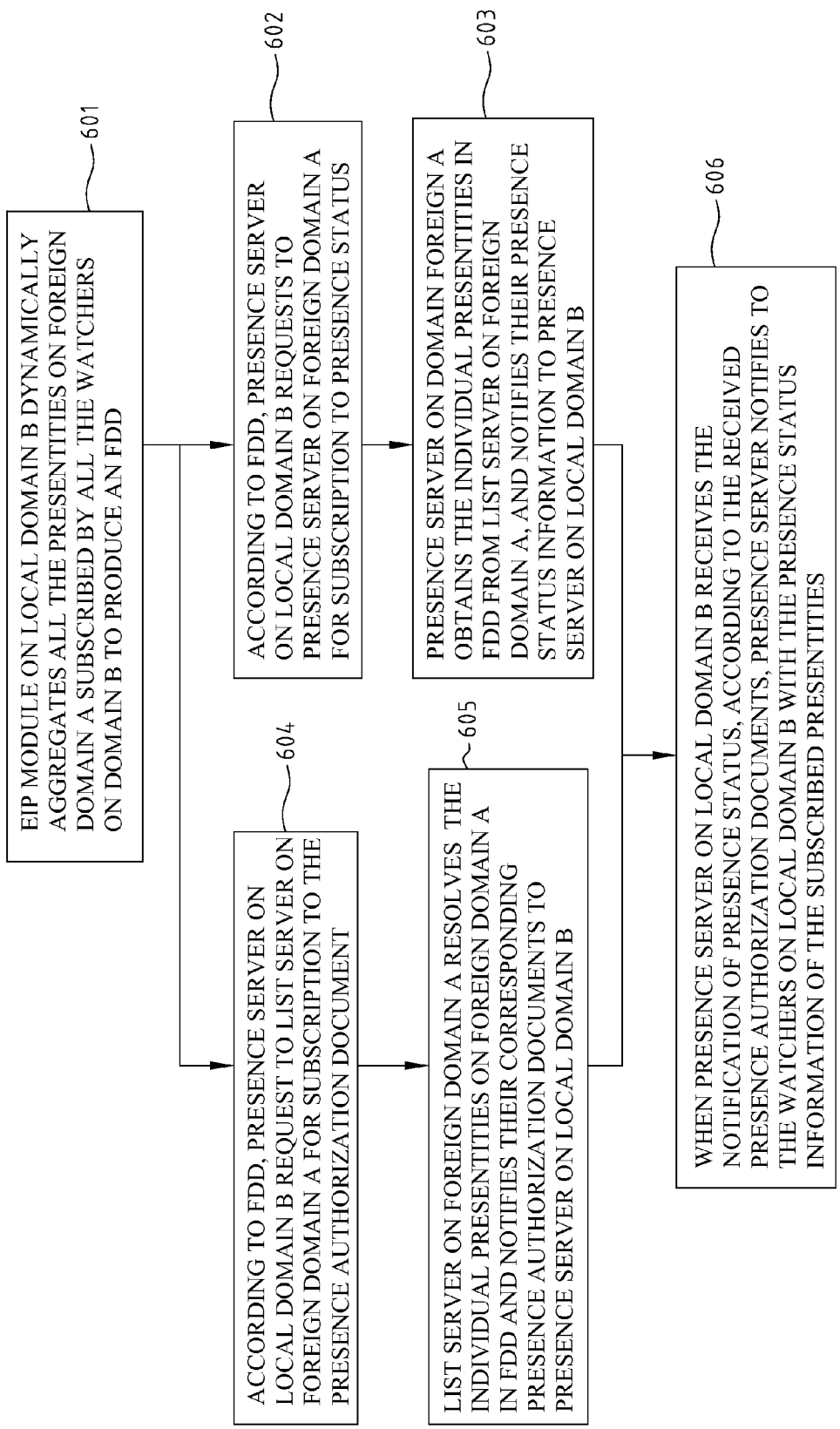
FIG. 6 shows an exemplary flowchart for illustrating the operation of FIG. 5, consistent with certain disclosed embodiments.

FIG. 6 shows an exemplary flowchart for illustrating the operation of FIG. 5, consistent with certain disclosed embodiments.

In step 601, EIP module 501 on local domain B dynamically aggregates all the presentities on foreign domain A subscribed by all the watchers on local domain B to produce an FDD 503. FDD 503 may be stored, maintained or updated in list server 512 on foreign domain A.

In step 602, according to FDD 503, presence server 521 on local domain B requests presence list subscription to presence server 511 on domain A. In other words, the intended subscribes is FDD 503 and the specific information is the presence status information.

In step 603, presence server 511 on foreign domain A obtains the actual individual presentities subscribed in FDD 503 from list server 512 on foreign domain A, and composes their presence status information and notifies to presence server 521 on local domain B. For example, presence server 511 on foreign domain A may use the notification mechanism to notify to presence server 521 on local domain B with the presence status information of actual presentities on foreign domain A.

Also in step 603, after presence server 521 on domain B receives the notification message from presence server 511 on foreign domain A, presence server 521 must compose the presence status referred to the presence authorization rule before dispatching the information to the watchers.

In step 604, according to FDD 503 of step 601, presence server 521 on local domain B requests to list server 512 on foreign domain A for list subscription to the presence authorization document. In other words, the intended subscribee is FDD 503, and the specific information is the presence authorization document.

In step 605, list server 512 on domain A resolves the individual presentities subscribed on foreign domain A in FDD 503 and notifies their corresponding presence authorization document to presence server 521 on domain B. For example, list server 512 on foreign domain A receives the list subscription request for presence authorization document from presence server 521 on local domain B, EIPAD module 502 of list server 512 on foreign domain A resolves FDD 503 content first to identify which authorization documents of those presentities are subscribed, and then accesses the corresponding authorization documents. Therefore, it is not necessary to establish the subscription to the presence authorization document for each of presentities. Then, the presence authorization document is notified to presence server 521 on local domain B through the notification mechanism.

In step 606, when presence server 521 on local domain B receives the presence status information, according to the received presence authorization documents, presence server 521 composes the presence status information of the subscribed presentities and then notifies them to the watchers on local domain B. In other words, when presence server 521 on local domain B receives presence status information or presence authorization documents, presence server 521 will notify to the watchers on local domain B with the presence status information provided by the subscribed presentities. For example, when presence server 521 on local domain B receives presence status information, according to the received presence authorization document, presence server 521 will know which watchers may receive what presence status information from the presentities on foreign domain A, and then compose the presence status information and use the notification mechanism to notify to each watcher.

In summary of the exemplary embodiments of FIGS. 5-6, the EIP module of presence server of the present invention may act as a client to establish the list subscription not only to the presence status information with the FDD, but also to the presence authorization document with the FDD. In this manner, through EIP module and EIPAD module, combined with FDD as the intended subscribee, the inter-domain subscribe/notify message may be reduced from depending on the number of watcher/presentity to a constant using domain as a subscription unit.

In addition to presence status information subscription, consideration on the presence authorization mechanism, the disclosed embodiments assume that the federated servers will trust each other. Therefore, when the foreign-domain presence server, such as 511, receives subscription request for FDD from local domain presence server, such as 521, the subscription establishment is allowed by default, and leaves the responsibility of execution of the presence authorization checking to the local-domain presence server, such as 521, to compose the corresponding presence status information.

The following exemplary embodiments show the presence subscription execution flows of the initialization stage, steady stage and the termination stage of the EIP module and EIPAD module combined with FDD from the watcher's point of view.

Figure 7A:
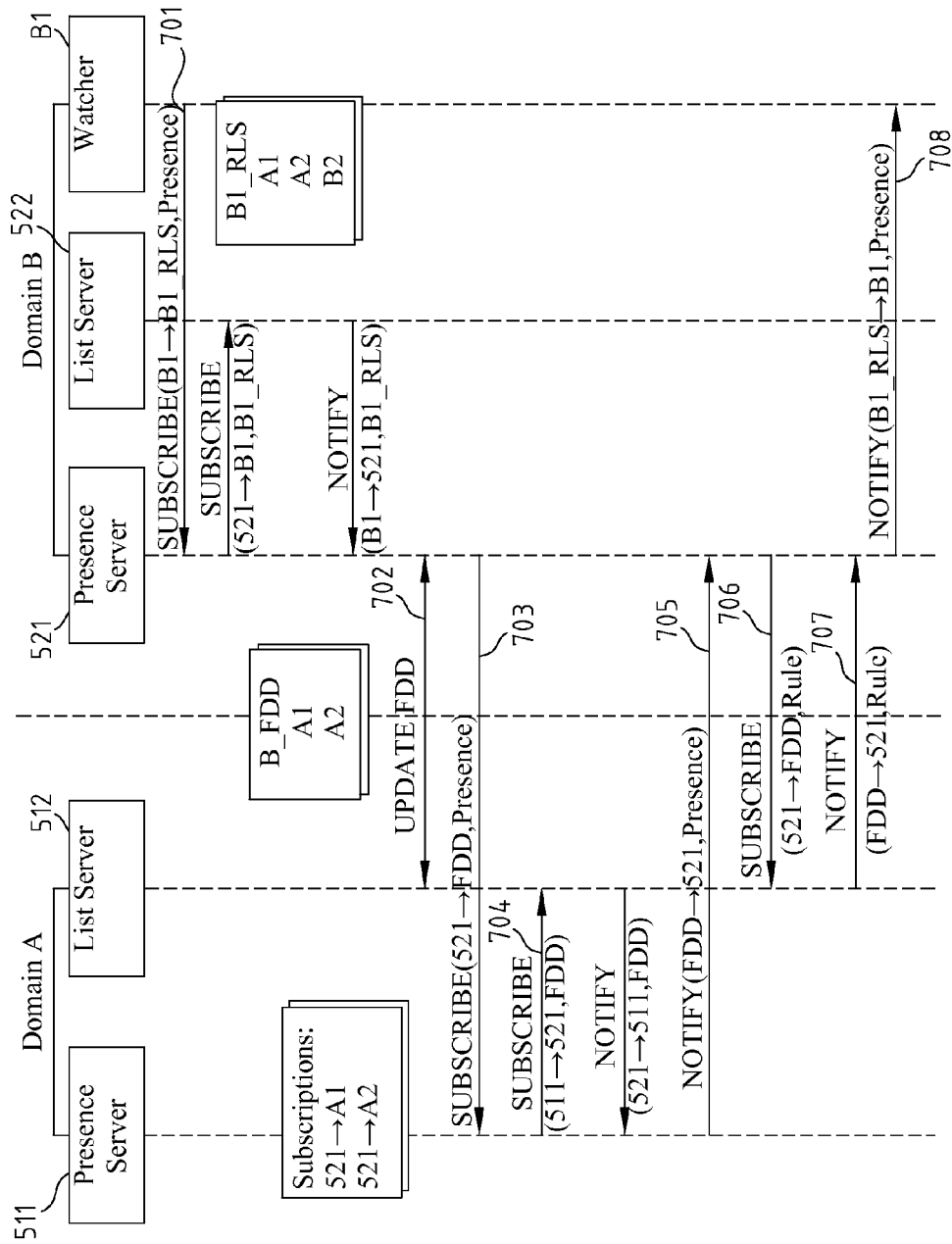
FIG. 7A shows an exemplary execution flow of the EIP module and EIPAD module combined with FDD for presence subscription when watcher B1 executes the initialization stage, consistent with certain disclosed embodiments.
Figure 7B:
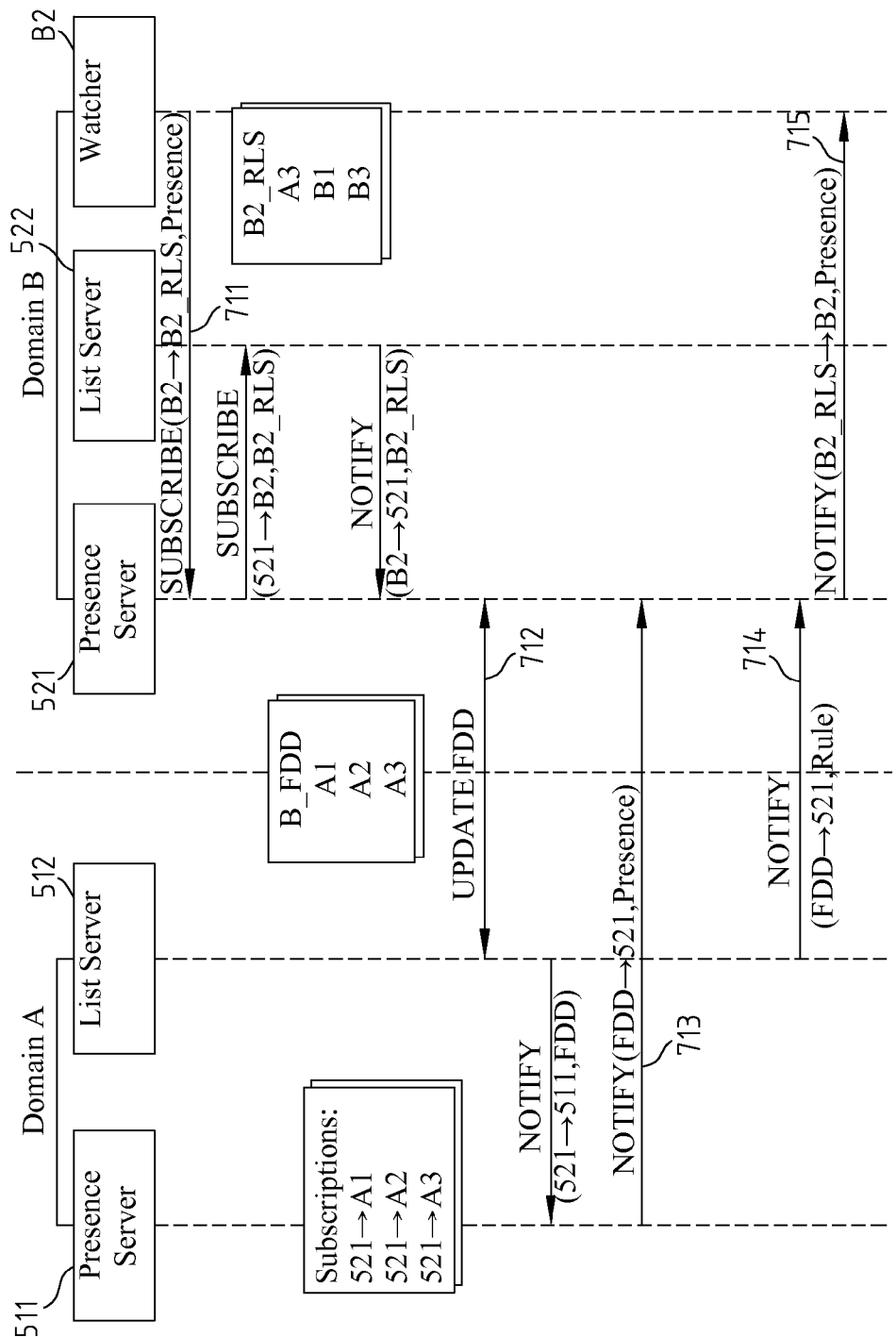
FIG. 7B shows an exemplary execution flow of the EIP module and EIPAD module combined with FDD for presence subscription when another watcher B2 executes the initialization stage, consistent with certain disclosed embodiments.
Figure 7C:
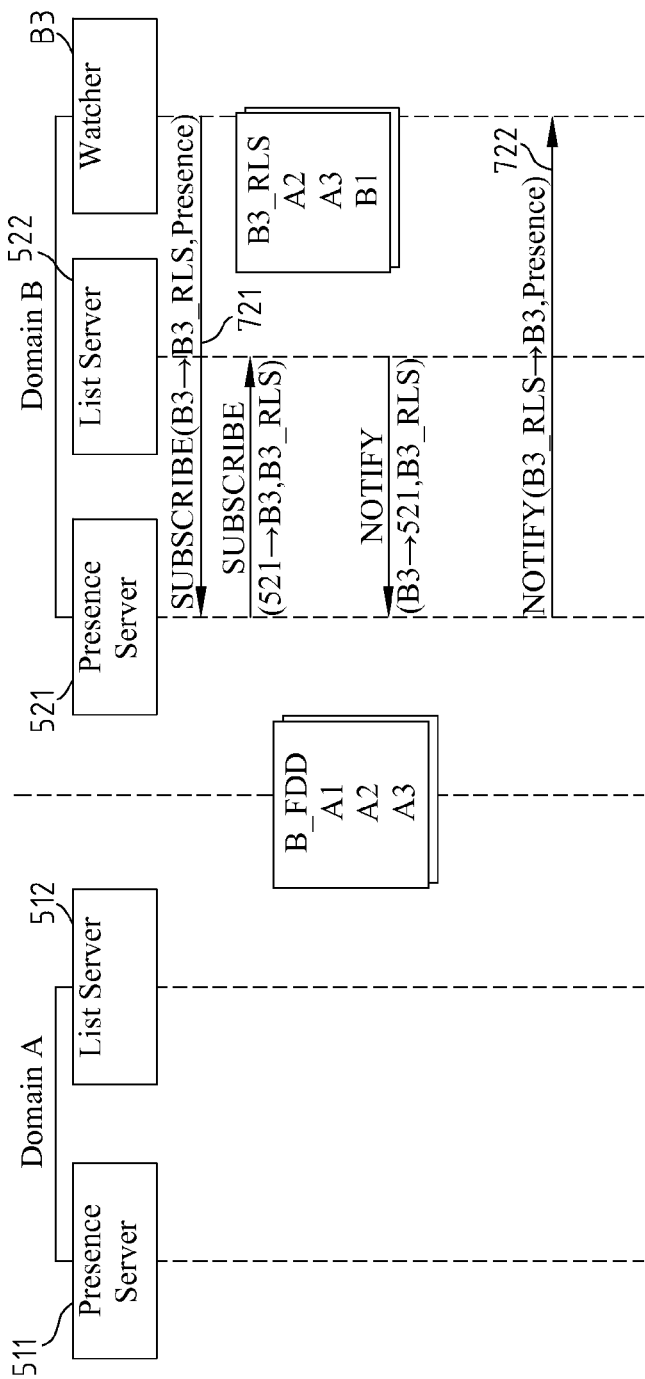
FIG. 7C shows an exemplary execution flow of the EIP module and EIPAD module combined with FDD for presence subscription when yet another watcher B3 executes the initialization stage, consistent with certain disclosed embodiments.

FIGS. 7A-7C show the presence subscription execution flow for initialization stage of the EIP module and EIPAD module combined with FDD, consistent with certain disclosed embodiments. Referring to FIG. 7A, when watcher B1 executes the initialization stage, watcher B1 on local domain B sends a subscription request to presence server 521. The subscription request is to subscribe the presence status of the presentities, such as A1, A2 and B2, of resource list B1_RLS of B1, as shown in label 701. Presence server 521 on domain B receives the subscription, determines the intended subscribees of the subscription, such as A1, A2, and B2, presence server 521 adds presentities A1, A2 on foreign domain A to FDD B_FDD. As shown in label 702, presence server 521 updates FDD B_FDD to list server 512 of foreign domain A.

As shown in label 703, presence server 521 sends the subscription to FDD B_FDD to presence server 511 on foreign domain A for presence status subscription. As shown in label 704, presence server 511 on foreign domain A subscribes FDD B_FDD to list server 512 to get the notification of the actual individual presentities (A1, A2) and then composes the corresponding presence information.

After establishing subscription, presence server 511 on foreign domain A notifies to presence server 521 on local domain B with the notification message of the presence status of presentities (A1, A2), as shown in label 705.

After receiving presence status, presence server 521 on local domain must execute the presence authorization checking before composing and dispatching the presence status information to the watchers. As shown in label 706, presence server 521 subscribes the presence authorization document to list server 512 on domain A. List server 512, after receiving the subscription request, resolves FDD B_FDD contents to identify that the subscription is to the presence authorization documents of presentities (A1, A2), and then use the notification mechanism to notify the authorization document to presence server 521 on local domain B, as shown in label 707.

Presence server 521, referring to the received authorization documents, determines that watcher B1 may obtain the presence status information of presentities (A1, A2), and then notifies watcher B1 of the presence status information, as shown in label 708.

Following FIG. 7A, it is shown that when a new watcher on domain B wants to subscribe one or more new presentities on domain A, the inter-domain communication may include: presence server on local domain B updating FDD to list server on foreign domain A; presence server on foreign domain A sending the notification message of the presence status information of the one or more presentities in the updated FDD to presence server on local domain B; and list server on foreign domain A sending the notification message of the presence authorization documents of the one ore more presentities in the updated FDD to presence server on local domain B.

FIG. 7B shows the presence subscription execution flows of the initialization stage of the EIP module and EIPAD module combined with FDD when another watcher B2 executing the initialization stage, consistent with certain disclosed embodiments. Referring to FIG. 7B, when watcher B2 executes the initialization stage, watcher B2 on local domain B sends a subscription request to presence server 521. The subscription request is to subscribe the presence status of the presentities, such as A3, B1 and B3, of resource list B2_RLS of B2, as shown in label 711. Presence server 521 on local domain B receives the subscription, checks the resource list B2_RLS and determines that one presentity of intended subscribes A3 is not on FDD B_FDD. Therefore, presence server 521 adds the presentity A3 on foreign domain A to FDD B_FDD and updates FDD B_FDD to list server 512 on foreign domain A, as shown in label 712.

The login process of watcher B2 is similar to the login process of watcher B1. The difference is that when watcher B1 logs in, presence server 521 establishes the subscription to presence status and authorization document of FDD B_FDD, while when watcher B2 logs in, both subscription establishments of FDD B_FDD are not repeated. That is, steps shown in labels 703 and 706 are not executed. Because of during the duration of subscriptions above, when watcher B2 logs in, the changes made by presence server 521 to FDD B_FDD will automatically trigger the notification message. As shown in labels 713 and 714, presence server 511 uses the notification message to notify to presence server 521 with the presence statue information of all or the updated presentities on FDD B_FDD, and list server 512 uses the notification message to notify to presence server 521 with the presence authorization documents of all or the updated presentities on FDD B_FDD.

Presence server 521, referring to the received authorization documents, determines that watcher B2 may obtain the presence status information of presentity A3, and uses notification message to notify to watcher B2, as shown in label 715.

From embodiments of FIGS. 7A-7B, it is clear that the subscription message to presence status information and subscription message to presence authorization document only appear once each in the initialization stage of the present invention, and do not depend on the number of the subscribing watchers.

FIG. 7C shows the presence subscription execution flows of the initialization stage of the EIP module and EIPAD module combined with FDD when yet another watcher B3 executing the initialization stage, consistent with certain disclosed embodiments. Referring to FIG. 7C, when watcher B3 executes the initialization stage, presence server 521 on local domain B receives the subscription to subscribe the presence status of the presentities, such as A2, A3 and B1, of resource list B3_RLS of B3, as shown in label 721.

Because presentities A2, A3 subscribed by watcher B3 are already in FDD B_FDD when watchers B1 and B2 log in, presence server 521 determines that no update to FDD B_FDD is required. It is only required to send a notification message to notify to watcher B3 with the presence status information of presentities A2, A3 and B1, as shown in label 722. Therefore, when watcher B3 logs in, no additional message for foreign domain A is required.

FIGS. 8A-8D show the execution flows for steady stage of the EIP module and EIPAD module combined with FDD for presence subscription, consistent with certain disclosed embodiments.

Figure 8A:
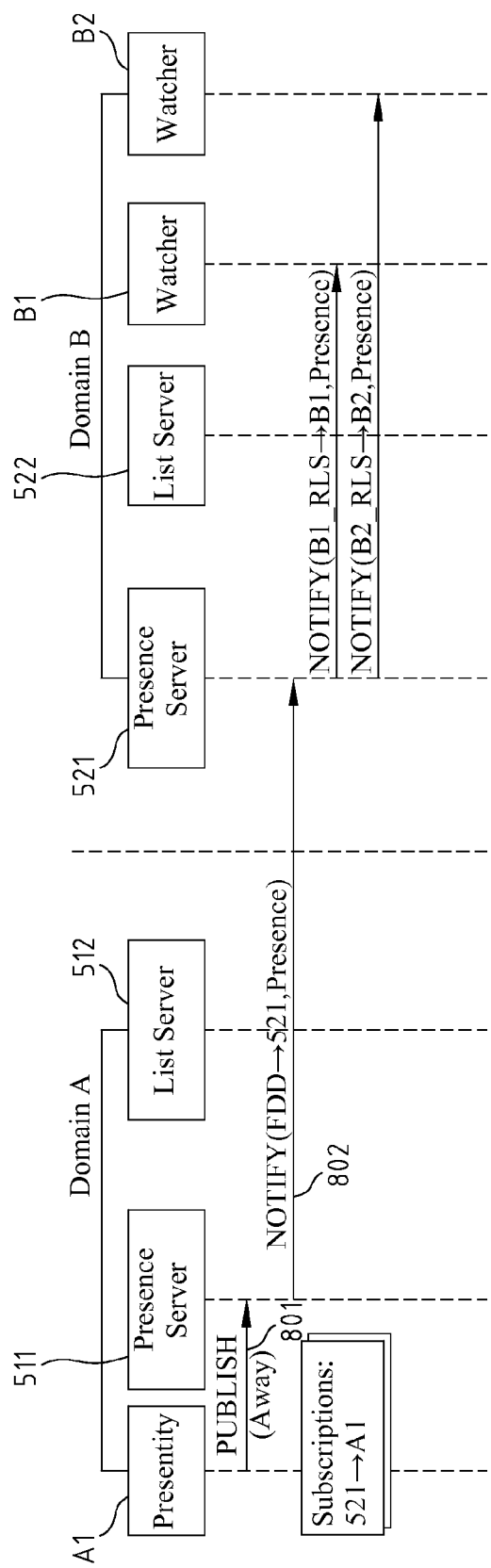
FIG. 8A shows an exemplary execution flow of the EIP module and EIPAD module combined with FDD for presence subscription when presentity on the foreign domain changes presence status in the steady stage, consistent with certain disclosed embodiments.

FIG. 8A shows an exemplary execution flow of the EIP module and EIPAD module combined with FDD for presence subscription when presentity on the foreign domain A changes presence status in the steady stage, consistent with certain disclosed embodiments. Referring to FIG. 8A, when presentity A1 changes its presence status, such as from online to away, and publishes it to presence server 511 on foreign domain A, as shown in label 801. For presence server 511 on foreign domain A, the presence subscription is established with presence server 521 on local domain B as using domain as a subscription unit; thus, only a notification message with the presence status information from foreign domain A will be sent to presence server 521 on local domain B, as shown in label 802. Presence server 521 on local domain B will then dispatch the presence status information of presentity A1 to corresponding watchers, such as B1 and B2.

Figure 8B:
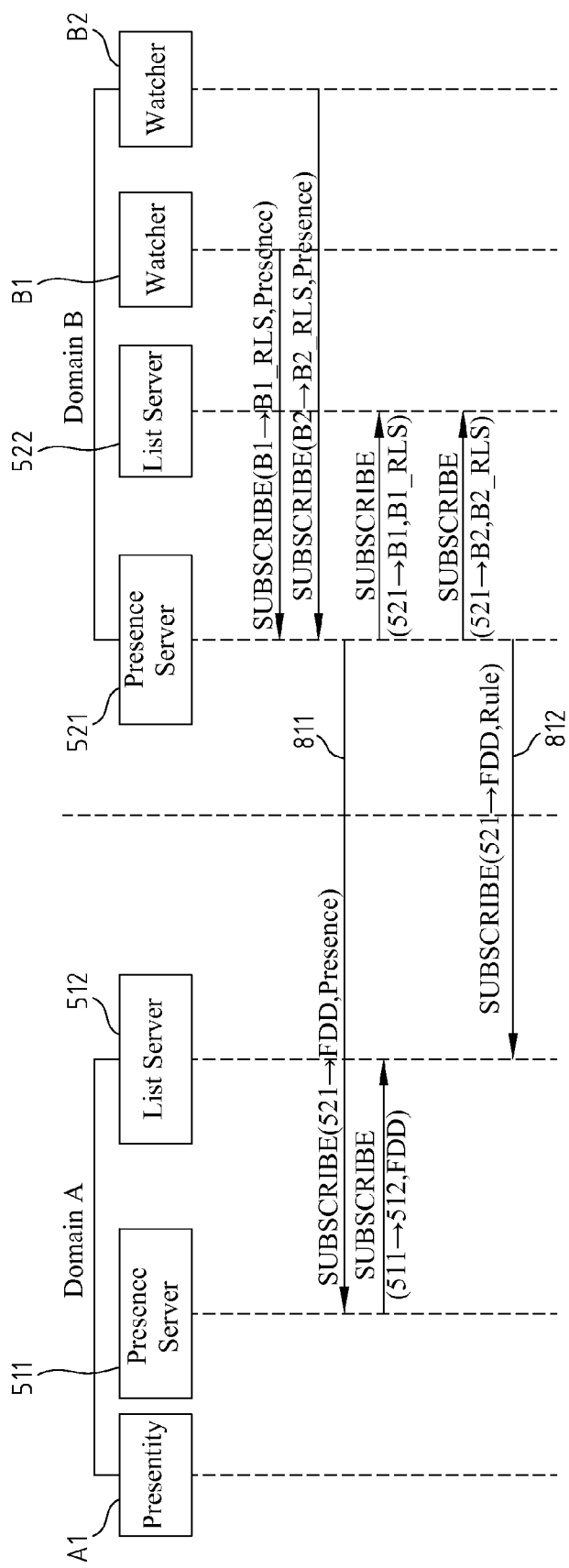
FIG. 8B shows an exemplary execution flow of the EIP module and EIPAD module combined with FDD for presence subscription when subscription is refreshed in the steady stage, consistent with certain disclosed embodiments.

FIG. 8B shows an exemplary execution flow of the EIP module and EIPAD module combined with FDD for presence subscription when subscription is refreshed in the steady stage, consistent with certain disclosed embodiments. Referring to FIG. 8B, the process for subscription refresh is similar to the process in the initialization stage. When watcher B1 and watcher B2 on domain B request presence server 521 to refresh the subscription, among the inter-domain subscription messages, only the subscription from presence server 521 on domain B to the presence status and presence authorization document, labeled as 811 and 812, of FDD B_FDD are refreshed. Other subscription refreshing messages belong to request locally on local domain. These two refreshing messages are independent of the number of the watchers.

Figure 8C:
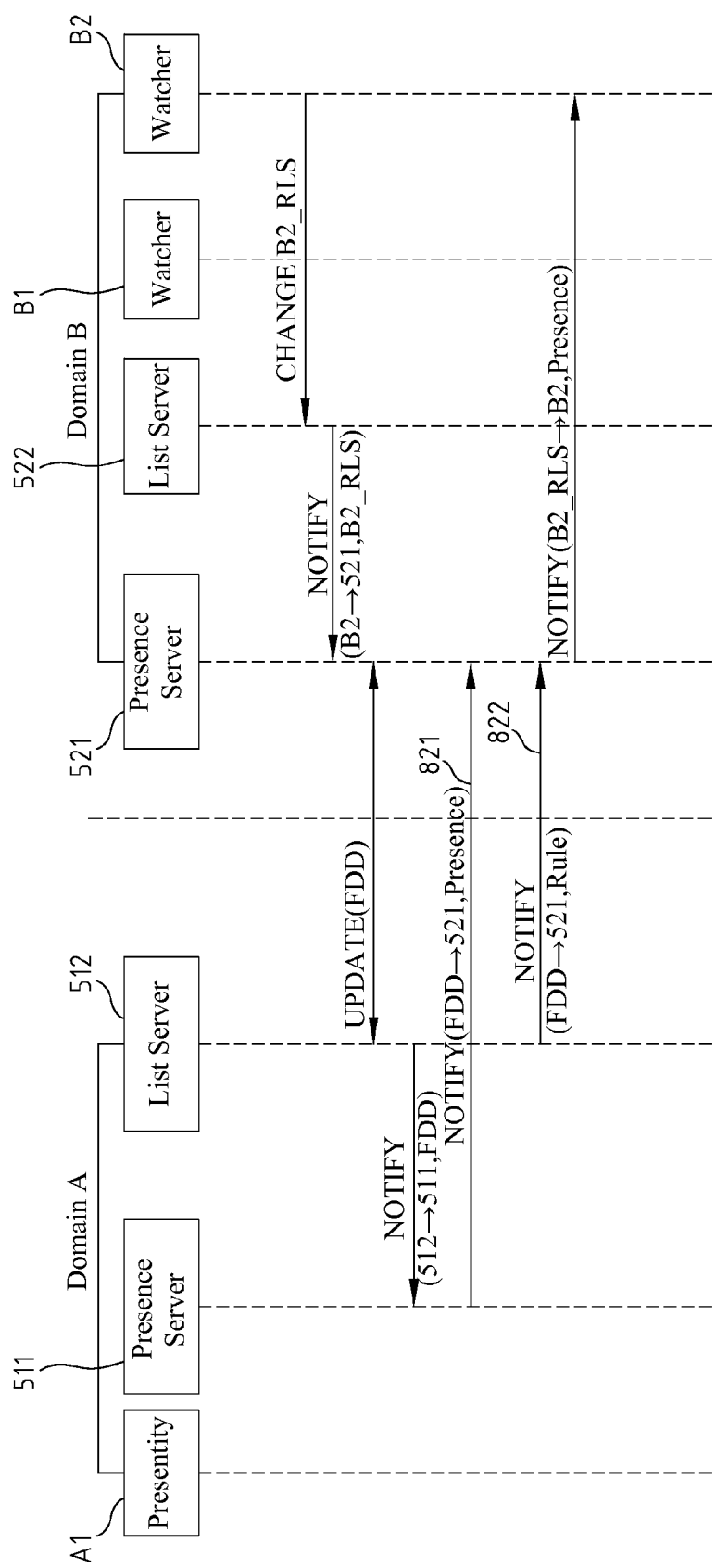
FIG. 8C shows an exemplary execution flow of the EIP module and EIPAD module combined with FDD for presence subscription when watcher changes resource list in the steady stage, consistent with certain disclosed embodiments.

FIG. 8C shows an exemplary execution flow of the EIP module and EIPAD module combined with FDD for presence subscription when a watcher changes resource list in the steady stage, consistent with certain disclosed embodiments. Referring to FIG. 8C, when watcher B2 changes the resource list, after list server 522 on local domain B notifies presence server 521 on local domain B, FDD B_FDD will be updated and stored if the original content of FDD B_FDD is indeed changed. Presence server 511 on foreign domain A sends notification message to presence server 521 on local domain B of the presence status of the changed presentities, as shown in 821. List server 512 on foreign domain A sends notification message to presence server 521 on local domain B of the presence authorization documents of the changed presentities, as shown in label 822. If no change is made to FDD B_FDD, then no update on FDD B_FDD is required and no message to/from foreign domain A is sent.

Figure 8D:
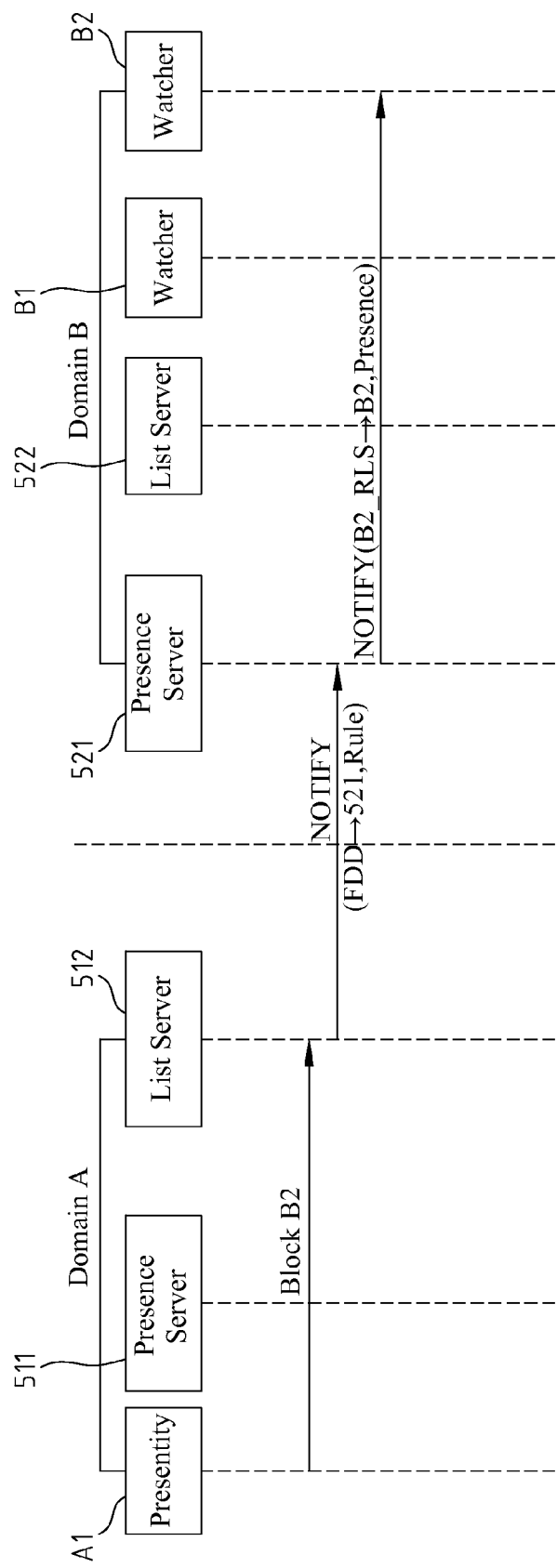
FIG. 8D shows an exemplary execution flow of the EIP module and EIPAD module combined with FDD for presence subscription when presentity on the foreign domain changes presence authorization to watcher in the steady stage, consistent with certain disclosed embodiments.

FIG. 8D shows an exemplary execution flow of the EIP module and EIPAD module combined with FDD for presence subscription when presentity changes presence authorization on watcher in the steady stage, consistent with certain disclosed embodiments. Referring to FIG. 8D, for list server 512 on foreign domain A, there exists the subscription to the presence authorization documents subscribed from presence server 521 on local domain B. Therefore, when presentity A1 on foreign domain A changes the presence authorization, such as blocking watcher B2, due to the content change of presence authorization document, list server 512 on foreign domain A is triggered to send a notification message to notify presence server 521 on local domain B of the presence authorization setting change. Presence server 521, according to the presence authorization change, composes the actual presence status information that watcher B2 may obtain, and then notifies the obtainable presence status information to watcher B2.

In the termination stage, all the subscriptions established in the initialization stage must be terminated, including the subscription from presence server 521 on local domain B to the presence status and the presence authorization document of FDD B_FDD. Also, presence server 521 on local domain B must remove the presentities in FDD B_FDD no longer being watched. The execution flow of the inter-domain message transmission in the termination stage is similar to that in the initialization stage, except that all the subscriptions in the initialization stage will be terminated in the termination stage.

In summary, the present invention provides an EIP module on the presence server and an EIPAD module on the list server in each domain. Combined with FDD, the EIP module and EIPAD module execute the list subscription/notification behavior to the access to the presence status and the presence authorization document to reduce the inter-domain message traffic. The present invention doesn't require upgrading the existing client facility, and it is transparent to the existing client facility. Besides, the present invention may communicate with the existing traditional presence server and list server; hence, the present invention has a high compatibility and a low construction and deployment cost.

Although the present invention has been described with reference to the exemplary disclosed embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for providing inter-domain presence services in presence service systems including different domains, said apparatus comprising:

a presence server in each of a local domain and a foreign domain, said presence server having an enhanced inter-domain presence (EIP) module, said EIP module in said local domain maintaining and updating a foreign domain document (FDD) by aggregating all foreign-domain presentities in said foreign domain subscribed by all watchers in said local domain; and a list server in each of said local domain and said foreign domain, said list server having an enhanced inter-domain presence authorization document (EIPAD) module, said EIPAD module in said foreign domain identifying actual presentities subscribed in said foreign domain based on said FDD and notifying said presence server in said foreign domain of said all foreign-domain presentities;

wherein said presence server in said local domain requests said presence server in said foreign domain for a domain-based list subscription to presence status according to said FDD, said presence server in said foreign domain obtains said all foreign-domain presentities subscribed by said all watchers in said local domain from said list server in said foreign domain, composes aggregated presence information of said all foreign-domain presentities and notifies said presence server in said local domain of said aggregated presence information in a single notification message, and said presence server in said local domain sends subscribed presence information in said aggregated presence information to respective watchers in said local domain.

2. The apparatus as claimed in claim 1, wherein said FDD is stored in said list server in said foreign domain but maintained and updated by said presence server in said local domain.

3. The apparatus as claimed in claim 1, wherein said list server in said foreign domain notifies said presence server in said foreign domain if contents of said FDD change, and said presence server in said foreign domain notifies said presence server in said local domain of said aggregated presence information according to the changed contents of said FDD in a single notification message if said aggregated presence information changes due to the changed contents of said FDD.

4. The apparatus as claimed in claim 1, wherein said EIP module in said local domain acts as a presence client of said presence server in said foreign domain to establish a domain-based list subscription of presence status according to said FDD.

5. The apparatus as claimed in claim 1, wherein said EIP module in said local domain acts as a presence client of said list server in said foreign domain to establish a domain-based list subscription of presence authorization document according to said FDD.

6. The apparatus as claimed in claim 5, wherein said EIPAD module in said foreign domain accesses corresponding presence authorization documents of said actual presentities subscribed in said foreign domain based on said FDD to compose aggregated presence authorization documents and notifies said presence server in said local domain of said aggregated presence authorization documents in a single notification message according to said domain-based list subscription of presence authorization document.

7. The apparatus as claimed in claim 6, wherein said EIPAD module in said foreign domain notifies said presence server in said local domain of said aggregated presence authorization documents in a single notification message if contents of said FDD change and said aggregated presence information changes due to the changed contents of said FDD.

8. The apparatus as claimed in claim 6, wherein said presence server in said local domain sends said subscribed presence information in said aggregated presence information to respective watchers in said local domain according to said aggregated presence authorization documents.

9. A method for providing inter-domain presence services in presence service systems including different domains, said method comprising:

using a presence server in a local domain to dynamically aggregate all foreign-domain presentities in a foreign domain subscribed by all watchers in a local domain, and producing a foreign domain document (FDD);

using a list server in said foreign domain to identify actual presentities subscribed in said foreign domain based on said FDD;

sending a request from said presence server in said local domain to a presence server in said foreign domain for a domain-based list subscription to presence status according to said FDD from;

using said presence server in said foreign domain to obtain said actual presentities subscribed in said foreign domain from said list server in said foreign domain, compose aggregated presence information of said all foreign-domain presentities, and notify said presence server in said local domain of said aggregated presence information in a single notification message;

sending a request from said presence server in said local domain to said list server in said foreign-domain for a domain-based list subscription to presence authorization document according to said FDD;

using said list server in said foreign-domain to access corresponding presence authorization documents of said actual presentities subscribed in said foreign domain based on said FDD to compose aggregated presence authorization documents and notify said presence server in said local domain of said aggregated presence authorization documents in a single notification message; and using said presence server in said local domain to send subscribed presence information in said aggregated presence information to respective watchers in said local domain according to said aggregated presence authorization documents.

10. The method as claimed in claim 9, further comprising the step of using said presence server in said local domain to notify respective watchers in said local domain of said subscribed presence information when said presence server in said local domain receives change notification of said aggregated presence authorization documents in a single notification message.

11. The method as claimed in claim 9, wherein when more than one foreign-domain presentity according to said FDD change presence status, said method further includes the steps of:

using said presence server in said foreign domain to notify said presence server in said local domain of said aggregated presence information according to the changed presence status in a single notification message; and using said presence server in said local domain to send subscribed presence information according to the changed presence status to each watcher affected by the changed presence status.

12. The method as claimed in claim 9, wherein when more than one foreign-domain presentity according to said FDD changes presence authorization setting, said method further includes the steps of:

using said list server in said foreign-domain to notify said presence server in said local domain of said aggregated presence authorization documents according to the changed presence authorization setting in a single notification message; and using said presence server in said local domain to send subscribed presence information to each watcher affected by the changed presence authorization setting.

13. The method as claimed in claim 9, wherein when more than one watcher request said presence server in said local domain to refresh presence information subscription, said presence server in said local domain only requests said presence server and said list server in said foreign domain to respectively refresh said domain-based list subscription to presence status and said domain-based list subscription to presence authorization document.

14. The method as claimed in claim 9, wherein each watcher of said watchers stores in said list server of said local domain a resource list of all presentities that the watcher requests to subscribe, and when the watcher changes said resource list, said method further includes the steps of:

notifying said presence server in said local domain of the changed resource list from said list server in said local domain;

using said presence server in said local domain to check said FDD based on the changed resource list, send subscribed presence information of one or more new presentities in the changed resource list to the watcher according to said aggregated presence authorization documents if said one or more new presentities in the changed resource list are already included in said FDD, and update said FDD if any change to said FDD is necessary;

using said list server in said foreign domain to notify said presence server in said foreign domain of updated all foreign-domain presentities according to the updated FDD;

using said presence server in said foreign domain to update said aggregated presence information of said updated all foreign-domain presentities, and notify said presence server in said local domain of the updated aggregated presence information in a single notification message;

using said list server in said foreign-domain to update said aggregated presence authorization documents of said updated all foreign-domain presentities and notify said presence server in said local domain of the updated aggregated presence authorization documents in a single notification message; and using said presence server in said local domain to send subscribed presence information of said changed resource list in said updated aggregated presence information to the watcher according to said updated aggregated presence authorization documents.

15. The method as claimed in claim 9, wherein when a new watcher in said local domain requests said presence server in said local domain for subscribing the presence status of one or more new presentities in said foreign domain that are not included in said FDD, said method further includes:

using said presence server in said local domain to change said FDD;

using said list server in said foreign domain to notify said presence server in said foreign domain of updated all foreign-domain presentities including said one more new presentities in said foreign domain according to said changed FDD;

using said presence server in said foreign domain to update said aggregated presence information of said updated all foreign-domain presentities, and notify said presence server in said local domain of the updated aggregated presence information in a single notification message;

using said list server in said foreign-domain to update said aggregated presence authorization documents of said updated all foreign-domain presentities and notify said presence server in said local domain of the updated aggregated presence authorization documents in a single notification message; and using said presence server in said local domain to send subscribed presence information of said one or more new presentities in said updated aggregated presence information to said new watcher according to said updated aggregated presence authorization documents.

16. The method as claimed in claim 9, when a new watcher in said local domain requests said presence server in said local domain for subscribing the presence status of one or more new presentities in said foreign domain that are already included in said FDD, said presence server in said local domain directly sends subscribed presence information of said one or more new presentities to said new watcher in said local domain according to said aggregated presence authorization documents.

* * * * *